United States Patent Office 3,655,775
Patented Apr. 11, 1972

3,655,775
GLYCERYL ETHERS
Wijbe Thomas Nauta, Nieuw Loosdrecht, Netherlands, assignors to N.V. Koninklijke Pharmaceutische Fabrieken v/h Brocades-Stheeman & Pharmacia, Amsterdam, Netherlands
No Drawing. Filed Sept. 13, 1967, Ser. No. 667,378
Claims priority, application Great Britain, Sept. 16, 1966, 41,540/66
Int. Cl. C07c 43/20
U.S. Cl. 260—611 A 2 Claims

ABSTRACT OF THE DISCLOSURE

The invention disclosed herein relates to glyceryl ethers having the general Formula I (I) 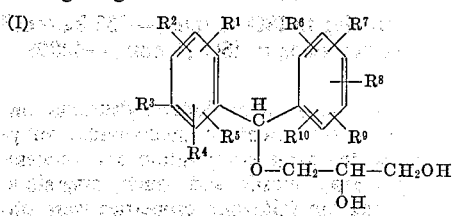

The compounds of this invention have been found to have activity as muscle relaxants, anti-convulsives and sedatives.

---

This invention relates to new, therapeutically useful glyceryl ethers, to processes for their preparation and pharmaceutical compositions containing them.

The new glyceryl ethers of the invention are those of the general formula (I) 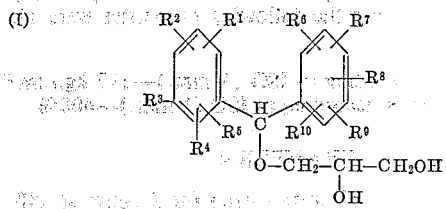

wherein $R^1$, $R^2$, $R^3$, $R^4$, $R^5$, $R^6$, $R^7$, $R^8$, $R^9$ and $R^{10}$ are the same or different and each represents hydrogen, alkyl or trifluoromethyl; and $R^1$ and $R^6$ together represent a $-CH_2-CH_2-$ or a $-CH=CH-$ bridge linking the two phenyl nuclei at ortho places in respect to the ether grouping. By the term "alkyl" as used in this specification is meant straight or branched chain alkyl groups having at most six carbon atoms.

The glyceryl ethers of Formula I have valuable therapeutic properties; they have muscle-relaxant, anti-convulsive, sedative, analgesic and neurotoxic activities. They can be formulated in any one of several forms as indicated hereinbelow for utilization in a patient, whether animal or human. The dose amount to be administered will generally be from .25 to 100 mg. daily administered orally or parenterally, dependent on the requirement of the recipient. The preferred dosage being from 5 to 25 mg. daily by oral administration. Preferred compounds are those wherein all the R symbols represent hydrogen.

According to a feature of the invention, the compounds of Formula I are prepared by reacting a reactive ester, for example, a halide, or a benzhydrol of the formula (II) 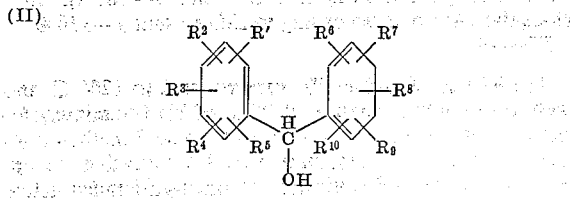

wherein the R symbols are as defined above, with glycerol. The reaction is preferably effected in an inert organic medium, for example, benzene, diethyl ether, tetrahydrofuran or pyridine, and in the presence of an acid-binding substance. In some cases, for example, when using pyridine, the solvent medium itself has acid-binding properties.

The above reaction forms ethers which are preferably converted into esters with an arylboronic acid of the formula (III) 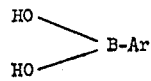

wherein Ar represents a phenyl or naphthyl group, which may carry one or more substituents selected from halogen atoms and alkyl, nitro, amino and carboxy groups. Preferred arylboronic acids are tolylboronic and anisylboronic acids. This conversion reaction results in cyclic boronic esters of the formula (IV) 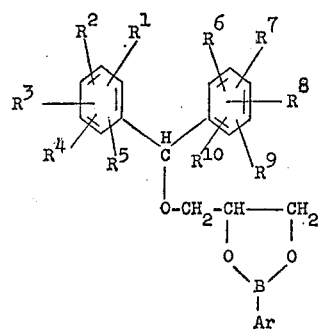

(wherein the various symbols are as hereinbefore defined) which can readily be purified by crystallization, for example, from methanol. The purified esters are easily converted into the compounds of Formula I by hydrolysis, preferably in an alkaline medium.

The arylboronic esters of Formula IV are new compounds and as such form a feature of the invention. They have interesting therapeutic properties of their own and may be used as neutron capturing agents in the treatment of tumors, for example, in the brain, administered from 0.5 to 10 mg./kg. daily to animals and humans.

In another method of preparing the new compounds of Formula I, a reactive ester, such as the halide (preferably chloride or bromide), of a benzhydrol of Formula II is first reacted with isopropylidene glycerol (V) 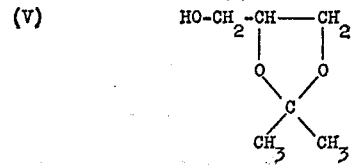

and the resulting compound of the formula (VI) 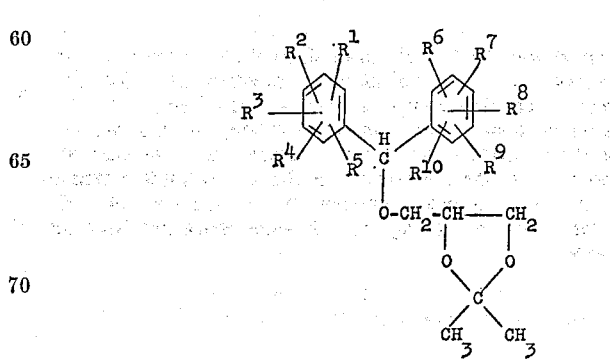

is reacted with orthoboric acid, $H_3BO_3$, to yield an orthoborate of the formula (VII)

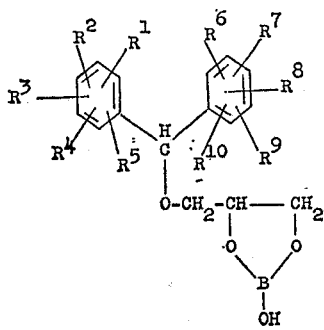

wherein the R symbols are as hereinbefore defined. These compounds are readily converted by hydrolysis into the compounds of Formula I.

The reaction between a reactive ester of benzhydrols of Formula I, e.g., halide, and isopropylidene glycerol is carried out by heating the reactants in the presence of a condensing agent such as an alkali metal, preferably sodium, or an alkali metal salt, such as sodium carbonate. If desired, the reaction is carried out in an inert anhydrous organic medium, such as toluene or xylene.

The following examples illustrate the invention.

EXAMPLE 1

3-(diphenylmethoxy)-propan-1,2-diol (a) To a solution of 45.7 g. of freshly distilled glycerol in 175 ml. of freshly distilled pyridine is added 46.0 g. of benzhydryl chloride. The mixture is heated for 20 hours at 140° C. with stirring. After cooling, the mixture is poured into 575 ml. of water. The oily layer is dissolved in diethyl ether and washed consecutively with 0.5 N sulphuric acid, 5% solution of potassium bicarbonate in water, and water. After drying with sodium sulphate, the solvent is removed by distillation and there is obtained 46.0 g. of a syrupy product.

(b) By means of heating, a solution is made of 32.6 g. of p-tolylboronic acid in anhydrous benzene. The warm solution is added to a solution of 31.0 g. of the syrup obtained with the procedure mentioned under (a). The mixture is distilled until the distillate becomes clear. The remaining solvent is also removed by distillation and the residue mixed with a 50% solution of methanol in water. A white precipitate crystallizes. After recrystallization from methanol, there is obtained 4 - [(diphenylmethoxy) methyl]-2-p-tolyl - 1,3,2 - dioxaborolane; melting point 55.5–57.5° C.

After hydrolysis with a solution of potassium hydroxide in water, there is obtained 3-(diphenylmethoxy)-propan-1,2-diol; melting point 51.5–53.5° C.

EXAMPLE 2

3-[(o-methyl-α-phenylbenzyl)oxy]propan-1,2-diol

Following the general procedure described in Example 1 but substituting (o-methyl-α-phenylbenzyl)chloride for the benzhydrylchloride, 4 - [{(o-methyl-α-phenylbenzyl) oxy}methyl] - 2 - p-tolyl-1,3,2-dioxaborolane is obtained; melting point 78–81° C.

Analysis.—Calc'd for $C_{24}H_{25}O_3B$ (percent): C, 77.43; H, 6.77; B, 2.90. Found (percent): C, 77.81; H, 6.87; B, 2.81.

Upon hydrolysis there is obtained 3-[(o-methyl-α-phenylbenzyl)oxy]propan-1,2-diol.

EXAMPLE 3

3-[(p-methyl-α-phenylbenzyl)oxy]propan-1,2-diol

Following the general procedure described in Example 1 but substituting (p-methyl-α-phenylbenzyl)chloride for the benzhydryl chloride, 4 - [{(p-methyl-α-phenylbenzyl) oxy}methyl]-2-p-tolyl-1,3,2-dioxaborolane is obtained.

Upon hydrolysis there is obtained 3-[(p-methyl-α-phenylbenzyl)oxy]propan-1,2-diol.

EXAMPLE 4

3-(di-o-tolylmethoxy)propan-1,2-diol

Following the general procedure described in Example 1 but substituting (di-o-tolylmethyl)chloride for the benzhydryl chloride, 4 - [(di-o-tolymethoxy)methyl]-2-p-tolyl-1,3,2-dioxaborolane is obtained, melting point 85–87° C.

Upon hydrolysis there is obtained 3 - (di-o-tolylmethoxy)propan-1,2-diol.

EXAMPLE 5

3-[(o-t.-butyl-α-phenylbenzyl)oxy]propan-1,2-diol

Following the general procedure described in Example 1 but substituting (o-t.-butyl-α-phenylbenzyl)chloride for the benzhydryl chloride, 4-[{(o-t.-butyl-α-phenylbenzyl) oxy}methyl]-2-p-tolyl-1,3,2 - dioxaborolane is obtained, melting point 126–130° C.

Analysis.—Calc'd for $C_{27}H_{31}O_3B$ (percent): C, 78.28; H, 7.54; B, 2.61. Found (percent): C, 79.29; H, 7.59; B, 2.36.

Upon hydrolysis there is obtained 3 - [(o-t.-butyl-α-phenylbenzyl)oxy]propan-1,2-diol.

EXAMPLE 6

3-(di-2,6-xylylmethoxy)propan-1,2-diol

Following the general procedure described in Example 1 but substituting (di-2,6-xylylmethyl)chloride for the benzhydryl chloride, 4 - [(di-2,6-xylylmethoxy)methyl]-2-p-tolyl-1,3,2-dioxaborolane is obtained, melting point 125–127° C.

Analysis.—Calc'd for $C_{27}H_{31}O_3B$ (percent): C, 78.28; H, 7.54; B, 2.61. Found (percent): C, 78.92; H, 7.35; B, 2.43.

Upon hydrolysis there is obtained 3-(di-2,6-xylylmethoxy)-propan-1,2-diol; melting point 107–109° C.

EXAMPLE 7

3-(diphenylmethoxy)propan-1,2-diol (a) A suspension of 10.6 g. of ignited sodium carbonate in 13.3 g. of isopropylidene glycerol is heated at 80° C. To the suspension is added a solution of 12.3 g. of benzhydryl bromide in 30 ml. of benzene. The mixture is heated for 20 hours at 80° C. with stirring. After cooling, the reaction mixture is added to a mixture of water and diethyl ether. The diethyl ether/benzene layer is dried with sodium sulphate. After removal of the solvents and distillation, there is obtained 4-[(diphenylmethoxy) methyl]-2,2-dimethyl-1,3-dioxolan.

(b) A solution of 5.3 g. of this compound and 11.0 g. of orthoboric acid in 35 ml. of the monomethyl ether of ethylene glycol is heated at 100° C. for half an hour. After cooling, the mixture is extracted with diethyl ether. The ethereal layer is washed with water and dried with sodium sulphate. The solvent is removed and the residue dissolved in a mixture of benzene and petroleum ether (boiling range 20–40° C.). There is obtained 3.9 g. of 3 - (diphenylmethoxy)propan - 1,2 - diol; yield 86%; melting point 51.5–53.5° C.

The invention includes within its scope pharmaceutical preparations containing, as active ingredient, at least one of the therapeutically active compounds of general Formula I or IV in association with a pharmacologically acceptable carrier. The preparations may take any of the forms customarily employed for administration of therapeutically active substances, but the preferred types are those suitable for oral administration and especially tablets, pills and capsules including the substance. The tablets and pills may be formulated in the usual manner with one or more pharmacologically acceptable diluents or excipients, for example lactose or starch, and include materials of a lubricating nature, for example calcium stearate. Capsules made of absorbable material, such as gelatin, may contain the active substance alone or in admixture with a solid or liquid diluent. Liquid preparations may be in the form of suspensions, emulsions, syrups or elixirs of the active substance in water or other liquid medium commonly used for making orally acceptable pharmaceutical formulations, such as liquid paraffin, or a syrup or elixir base. The active substance may also be made up in a form suitable for parenteral administration, i.e., as a suspension or emulsion in sterile water or an organic liquid usually employed for injectable preparations, for example a vegetable oil such as olive oil, or a sterile solution in an organic solvent.

The invention may be variously otherwise embodied within the scope of the appended claims.

What is claimed is:

1. A compound having the formula

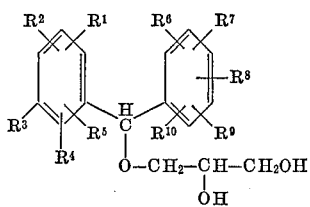

wherein $R^1$, $R^2$, $R^3$, $R^4$, $R^5$, $R^6$, $R^7$, $R^8$, $R^9$ and $R^{10}$ are the same or different and each represents hydrogen or lower alkyl having at most six carbons.

2. A compound in accordance with claim 1 having the name 3-(di-2,6-xylylmethoxy)propan-1,2-diol.

References Cited

Petrow et al., Journal of Pharmacy and Pharmacology, vol. 8 (1956), pp. 666, 668, 670–671.

BERNARD HELFIN, Primary Examiner

U.S. Cl. X.R.

260—462 R, 999, 340.9